United States Patent [19]

Tyler

[11] Patent Number: 4,695,375

[45] Date of Patent: Sep. 22, 1987

[54] SELF-CONTAINED HYDRAULICALLY OPERABLE WATER PURIFIER

[76] Inventor: Truman V. Tyler, 1440 Northwood Rd., Apt. 242A, Seal Beach, Calif. 90740

[21] Appl. No.: 867,800

[22] Filed: May 27, 1986

[51] Int. Cl.$^4$ .............................................. B01D 13/00
[52] U.S. Cl. .................................. 210/110; 210/117; 210/257.2; 210/321.1; 210/433.2
[58] Field of Search .................. 210/87, 88, 90, 98, 210/109, 117, 134–137, 257.2, 321.1, 433.2, 101, 110, 195.2

[56] References Cited

U.S. PATENT DOCUMENTS

| | | | |
|---|---|---|---|
| 2,556,539 | 6/1951 | Hellberg | 210/162 |
| 3,493,495 | 2/1970 | Mendelson | 210/23 |
| 3,493,496 | 2/1970 | Bray et al. | 210/23 |
| 3,498,910 | 3/1970 | Mendelson | 210/23 |
| 3,504,796 | 4/1970 | Bray | 210/137 |
| 3,568,843 | 3/1971 | Brown | 210/321 |
| 3,630,378 | 12/1971 | Bauman | 210/257 |
| 3,679,055 | 7/1972 | Clark et al. | 210/110 |
| 3,688,911 | 9/1972 | Baerg | 210/321 |
| 3,719,593 | 3/1973 | Astil | 210/135 |
| 3,726,793 | 4/1973 | Bray | 210/23 |
| 3,735,604 | 5/1973 | Astl | 62/316 |
| 3,746,640 | 7/1973 | Bray | 210/23 |
| 3,794,172 | 2/1974 | Bray | 210/257 |
| 3,794,173 | 2/1974 | Bray | 210/257 |
| 3,831,757 | 8/1974 | Gossett et al. | 210/143 |
| 3,887,463 | 6/1975 | Bray | 210/110 |
| 3,959,146 | 5/1976 | Bray | 210/257 |
| 4,077,883 | 3/1978 | Bray | 210/136 |
| 4,176,063 | 11/1979 | Tyler | 210/101 |
| 4,585,554 | 4/1986 | Burrows | 210/110 |
| 4,595,497 | 6/1986 | Burrows | 210/110 |

Primary Examiner—Ivars Cintins
Attorney, Agent, or Firm—Gausewitz, Carr & Rothenberg

[57] ABSTRACT

The water purifier is operated entirely automatically and hydraulically in response to the opening and closing of the outlet valve from which pure water is drawn. All of the passageways and control valves are contained within a unitary body so that there are no external hoses and fittings. The only connections to the body are a pure water outlet, a waste water outlet and the water inlet. In the filter chamber a reverse-osmosis filter membrane is circumscribed by a brine seal at the same end portion as where the pure water is discharged. All water passageway connections are made at that end of the filter chamber, so that the other end can be unthreaded for removal and replacement of the filter membrane without disconnecting water lines. An improved pilot valve within the unit has a tapered end portion engaging an O-ring seat held in place by a spring-pressed washer. The unit also includes a fast-acting check valve, with a floating valve member connected to the periphery of the valve chamber by a plurality of flexible strips.

36 Claims, 9 Drawing Figures

SELF-CONTAINED HYDRAULICALLY OPERABLE WATER PURIFIER

BACKGROUND OF THE INVENTION

Water purification by means of a reverse-osmosis filter membrane has become well recognized as producing water of excellent quality. However, many prior art water purifiers are not well adapted for home use. A common failing has been a requirement that water flow continually through the unit, even when its storage tank was full of purified water, causing an obvious waste of water. Some prior water purifiers require a pressurized container for receiving the pure water, resulting in variations in delivery pressure and undesirable back pressure on the reverse-osmosis filter membrane. Mechanical valve actuators have been incorporated in water purifier systems, and in other instances certain of the valves were electrically operated. These have added to manufacturing and installation costs, decreased reliability, and in some instances made the purifiers somewhat difficult to operate.

The system disclosed in my U.S. Pat. No. 4,176,063 represents an efficient water purifier for hoome and other uses, operated entirely hydraulically upon opening and closing of the faucet that dispenses the purified water. However, this system suffers from certain disadvantages. A major problem is that it requires a multiplicity of exterior hoses connecting various valve elements and controls. The result is a proliferation in the number of parts making up the purifier, adding to the complexity and expense of manufacture and servicing. A fitting is required at each hose connection, each one having a potential for leakage. The multipart purifier with its exterior hoses becomes unduly bulky, and its appearance suffers. Moreover, the construction and operation of certain control valves, such as the pilot valve and the shutoff valve to prevent dissipation of squeeze water as the pure water is being forced to the tap, can be improved upon for reliability and simplicity.

A major servicing problem with prior water purifiers has centered around the reverse-osmosis filter membrane, which must be removed and replaced periodically. This has involved removing the water purifier from underneath the sink and disconnecting various water lines. The filter membrane then must be removed from the pressure vessel by forcing a rod down through one end of the vessel to push the filter membrane out the other. This has required skilled service personnel, and is a time-consuming and expensive operation.

In a fully automatic and hydraulically operated water purifier, such as that of U.S. Pat. No. 4,176,063, it is necessary to include a check valve in the pure water line to trap water under pressure in the line that leads to the faucet. This is essential as the pressure of this water is used in effecting operation of other control valves in the system. This check valve must work with great rapidity and be fluid-tight when closed to prevent dissipation of the pressure after the faucet is closed. The volume of water involved is relatively small so it takes little reverse flow to cause a major reduction in the pressure of the water trapped by the check valve. A simple ball check valve has been found to be completely unsatisfactory. Other check valves, such as the fluid operated valve shown in the aforementioned patent, or a flapper-type check valve, do not operate with the speed necessary to prevent a significant drop in pressure after the faucet is closed. This presents the risk that there may be insufficient pressure available to operate certain of the control valves, especially in areas where water supply pressure is relatively low. Moreover, water flowing in the reverse direction past the check valve before full closing of this valve can create an unpleasant sound. Consequently, there has been a need for an improved check valve in water purifier systems.

SUMMARY OF THE INVENTION

The present invention overcomes the disadvantages of the prior art and provides an improved water purifier offering many superior characteristics. The pressure vessel for the reverse-osmosis filter membrane, the pure water storage tank, the various water passageways and the control valves all are incorporated within a unitary body of molded plastic material. Exterior hoses are entirely eliminated, making the purifier simpler in construction, more economical to manufacture and of significantly improved reliability. Servicing also is simplified.

For example, all of the connections to the filter chamber are at one end, which is a fixed portion of this element. A larger component of the filter chamber threads onto the fixed part, but has no water connections to it. Consequently, removal and replacement of the reverse-osmosis filter membrane is vastly improved as the larger section of the filter chamber simply is unscrewed from the remainder of this element, providing full access for servicing of the filter membrane.

Also, the pilot valve within the unit, which controls the operation of the squeeze valve for pressuring the pure water within the storage tank, is of improved construction, including a leak-proof valve arrangement in which the movable valve element has a tapered end engaging an O-ring seat. The O-ring is held in position by a compression spring bearing against a washer positioned over a recess receiving the O-ring. The spring also biases the piston valve actuator away from the seat. Another improvement lies in the shutoff valve to prevent dissipation of the water used to force pure water from the storage tank, this now being a reliable ball valve which is unseated, as necessary, by a piston-actuated valve operating member to allow unpurified water from the storage tank to be conducted to the drain as the tank fills.

The check valve to trap operating pressure in part of the pure water passageway after closing of the faucet also is significantly better than in prior art designs. It includes a movable valve member, such as an elastomeric disc, engageable with a seat to prevent fluid flow. The valve member is constrained by a plurality of flexible strips that connect the valve member to the fixed structure. These connecting strips are of undulant shape to allow outward and inward movement of the valve member while guiding its travel. This valve closes instantaneously so that virtually no pressure is lost and the operation of the system is noiseless. The necessary pressure operation of the affected control valves is assured.

The purifier also has an improved method of retaining the bladder within the tank, as well as other features which result in a purifier of superior characteristics.

DETAILED DESCRIPTION OF THE INVENTION

Figure 1:
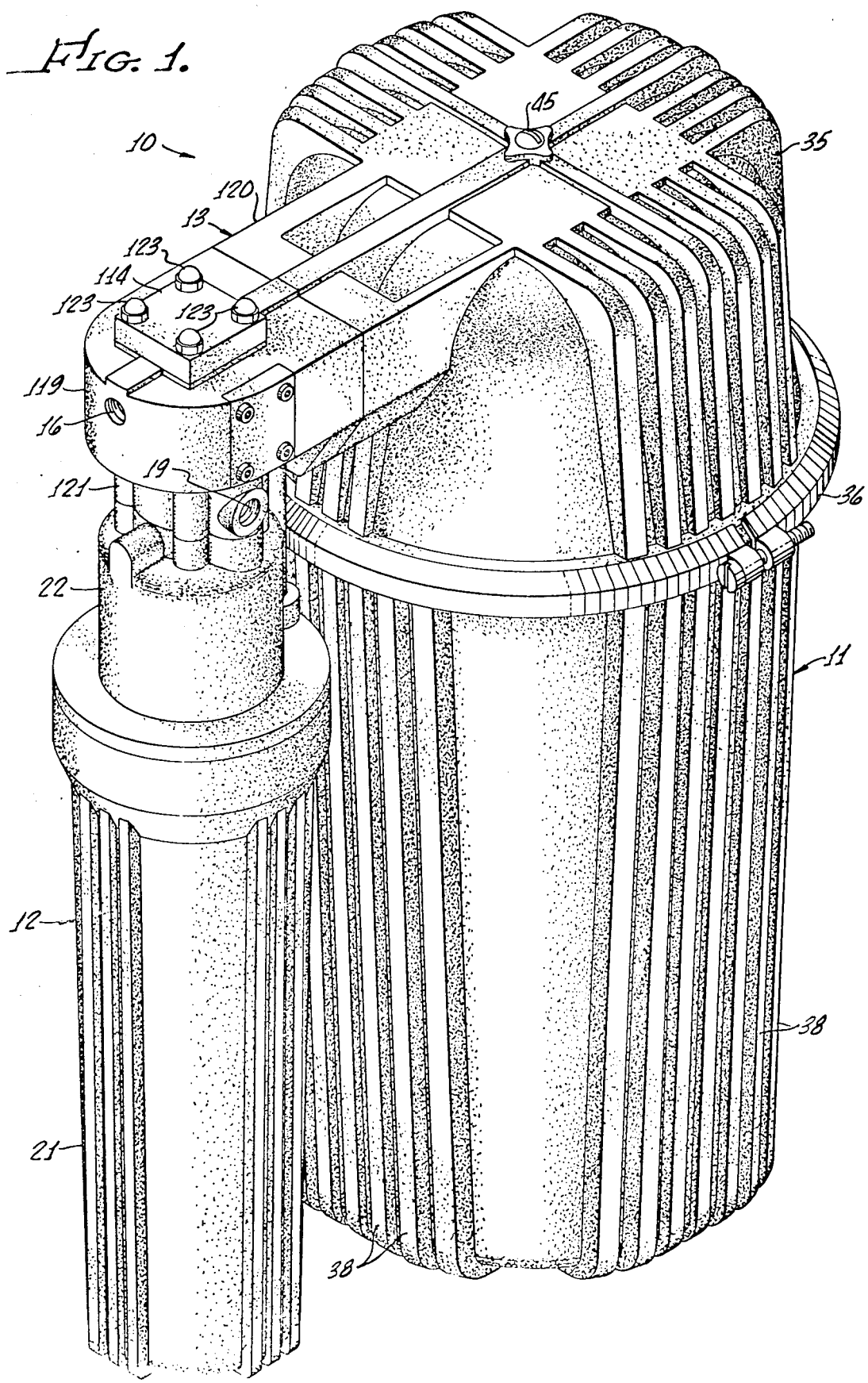
FIG. 1 is a perspective view of the water purifier of this invention.

The water purifier of this invention includes a unitary molded plastic body 10, the principal sections of which are a storage tank 11, a pressure vessel serving as a filter chamber 12 and an interconnecting section 13 between one end of the tank and one end of the filter chamber. The segments of the unitary body 10 maintain the tank 11 and filter chamber 12 parallel to each other and closely spaced apart. The various water passageways and control valves for accomplishing automatic operation are incorporated entirely within the plastic body 10 so that the multiplicity of separate hoses and fittings of prior hydraulically operated water purifiers are eliminated. There are only three points of connection to the body 10, these being an inlet 14 connected to a water supply line 15, an outlet 16 from which purified water is conducted through a line 17 to a faucet 18, and an outlet 19 for connection to a drain.

The filter chamber 12 is an elongated generally cylindrical housing, including a principal portion 21 which connects by screw threads (see FIG. 2) to an end part 22, which is of reduced internal diameter beyond the threads. The end part 22 is fixed to the remainder of the body 10, while the larger portion 21 is separable by unthreading. Within the filter chamber 12 is a cylindrical reverse-osmosis filter membrane 23 most of the length of which is within the principal portion 21 of the filter chamber. One end portion of the filter membrane 23 extends into the end part 22 of the chamber. An annular brine gasket 24 circumscribes the reverse-osmosis filter membrane 23 a short distance inwardly of the membrane's end 25 that fits within the end part 22 of the filter chamber. This seals the exterior of the membrane 23 relative to the inner surface of the cylindrical wall of the end part 22 of the filter chamber.

Pressurized tap water from the inlet 14 is connected through a passageway 26 to the end part 22 of the filter chamber 12 at a location that, relative to the filter membrane 23, is axially inward of the gasket 24. This connection is at the reduced-diameter portion of the end part 22 at its cylindrical wall. The inlet water passageway 26 begins in the interconnecting portion 13 of the body 10, extending to an inlet valve 27, downstream of which is a connection to a rigid straight plastic tube 28 that leads to a spaced continuation of the passageway in the end portion 22 of the filter chamber 12.

Figure 2:
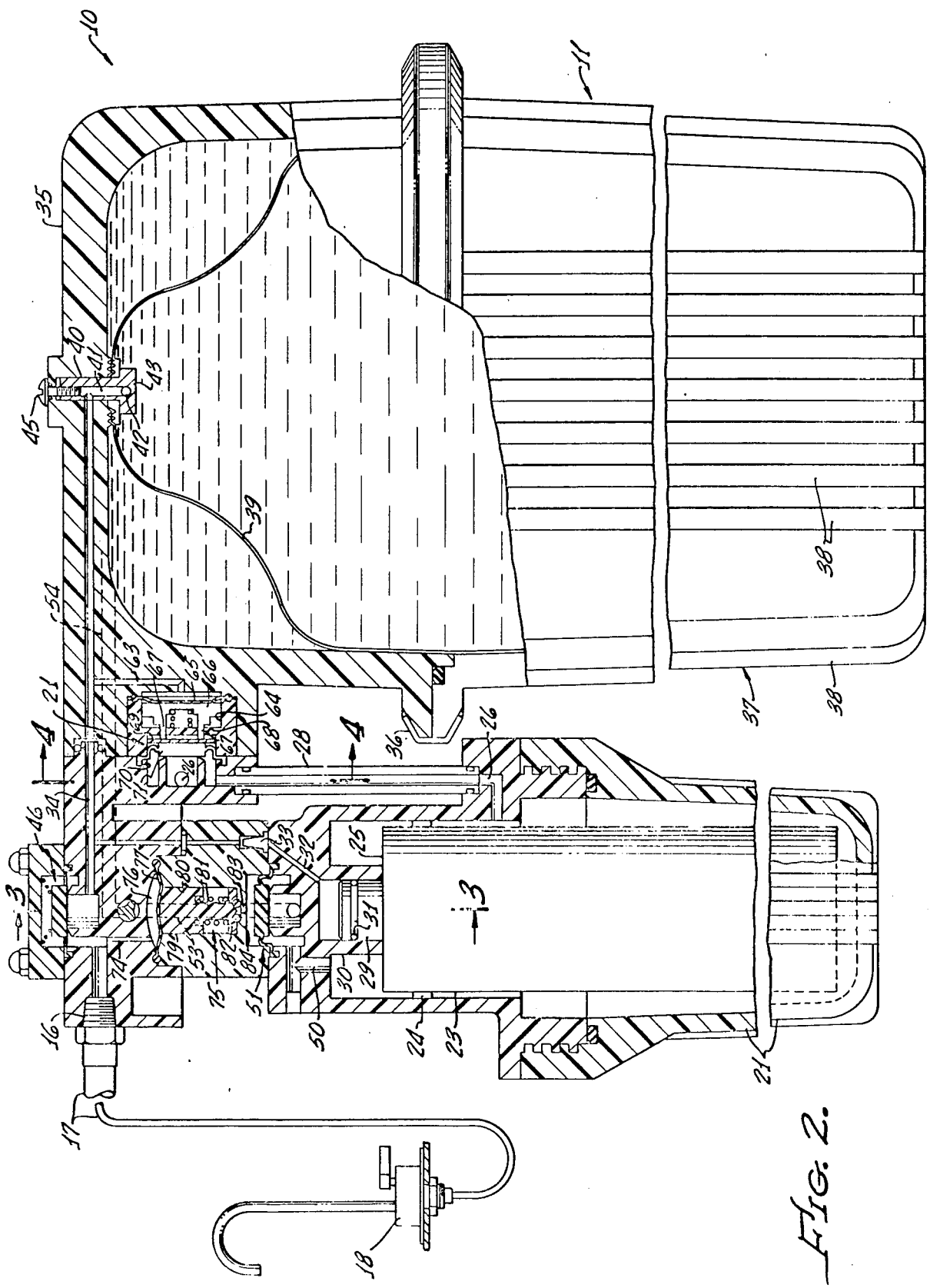
FIG. 2 is a longitudinal sectional view of the purifier.

At the axis of the filter membrane 23 is a perforated tube 29 which receives the pure water that seeps through the filter membrane. One end of the tube is closed. This is at the lower end of the filter chamber 12, as illustrated in FIG. 2, within the removable portion 21. The opposite end of the tube 29 is open and projects beyond the end 25 of the membrane 23. This end of the filter tube 29 extends into a short tubular element 30 at the axis of the end part 22 of the filter chamber 12, where it is sealed by an O-ring 31. Consequently, the pure water can flow outwardly into the short internal tubular element 30 from which it enters a portion 32 of the pure water passageway that connects to the tubular element 30. Within this part of the pure water passageway is a duckbill-type check valve 33 (seen in FIGS. 2, 7 and 8), permitting flow only away from the filter chamber. The principal pure water passageway, being at one end of the body 10, is located outwardly of all the control valves of the system, except for one check valve that is in this passageway. This facilitates directing the pure water to the end of the tank in a compact, self-contained unit.

The pure water passageway 32 connects perpendicularly at its opposite end to a larger principal pure water passageway 34 which extends straight across the outer end portion of the body 10, through the connecting part 13 to one end of the tank 11. This is the end cap portion 35 of the tank which connects by an annular clamp 36 to a main tank portion 37 which may be provided with strengthening ribs 38 along its exterior.

Within the tank 11 is a flexible bladder 39 of plastic material into which the pure water discharges. A sleeve 40 at the end of the tank 11 includes a passageway 41 (shown in FIGS. 2 and 6) that connects to the pure water passageway 34. A transverse outlet 42 in the head 43 of the sleeve 40 provides communication with the interior of the bladder 39. Under the head 43 of the sleeve 40 is a washer 44 having a serrated surface that matches serrations on the wall of the tank around the sleeve 40. The bladder 39 has an opening that receives the sleeve 40, and is clamped between the serrations of the washer 44 and the tank, which holds the bladder to the tank. A screw 45, with its head outside the tank, meshes with the threaded outer end of the sleeve 40 to secure the sleeve in position.

Near its opposite end, the pure water passageway 34 extends past a check valve 46 to the pure water outlet 16 from where it can be conducted through the line 17 to the faucet 18 or other outlet valve.

Figure 3:
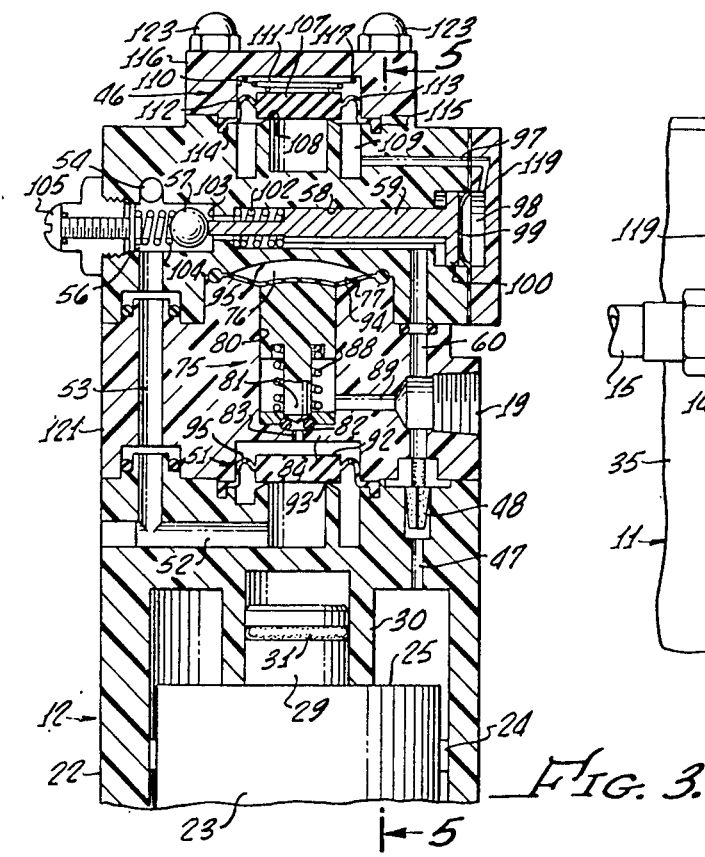
FIG. 3 is a sectional view taken along line 3—3 of FIG. 2.
Figure 6:
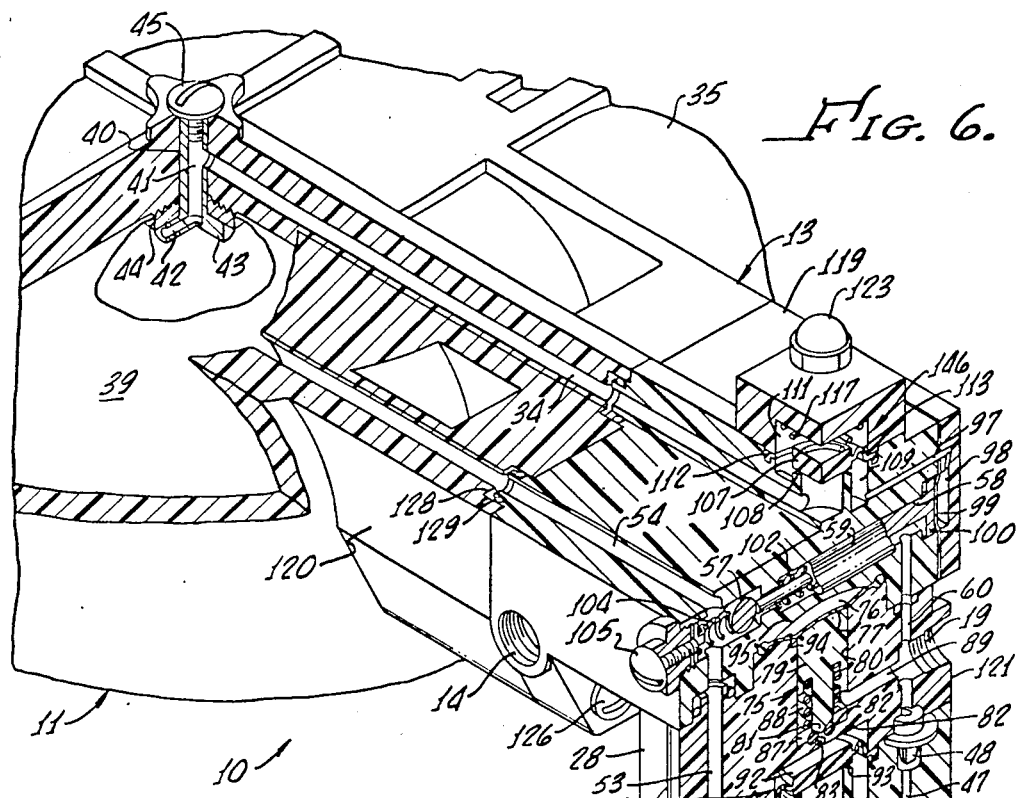
FIG. 6 is a fragmentary perspective view, partially broken away, showing various components of the purifier.

Some of the water which enters the filter chamber 12 is not filtered into the central core of the membrane 23, but instead discharges through the end 25 of the membrane 23 into the end of the portion 22 of the filter chamber. This is brine water, containing impurities, which is sealed from the inlet water by the gasket 24 and from the purified water by the O-ring 31. A brine water passageway 47 connects to the interior of the fixed filter chamber section 22, outside of the tubular element 30 at the end of the chamber, and conducts the brine water to the drain 19 for discharge (FIGS. 3 and 6). Within the passageway 47 is a metering valve 48 which limits the amount of water flowing through the passageway 47 to the drain 19 to provide a predetermined ratio of brine water to pure water. Generally, this is within the range of five to ten parts of brine water to one part of pure water.

Water pressure applied to the exterior of the bladder 39 is used to displace the bladder and force pure water through the passageway 34 and the line 17 to the faucet 18 in response to opening the faucet, as explained below. Accordingly, there is an additional passageway for conducting unpurified water from the filter chamber 12 to the tank 11 for the purpose of applying pressure on the outside of the bladder 39. This passageway 50 also is within the fixed end part 22 of the filter chamber 12 outside of the tubular element 30 and at the end of the filter chamber. Unpurified water from the passageway 50 can flow past a squeeze valve 51, located opposite from the axis of the filter chamber 12, when the latter valve is open, into a tranverse passageway 52. An additional passageway 53 connects to the passageway 52 and, in turn, joins an elongated passageway 54 that extends through the interconnecting portion 13 of the body to the tank 11 at its end cap 35. The passageway 54 is parallel to the pure water passageway 34 and located adjacent the end of the body 10. Thus, the passageways 50, 52, 53 and 54 permit water from the filter chamber 12 to be conducted to the tank on the outside of the bladder 39 for squeezing the pure water out of the tank to the faucet 18. As this water flows through the filter membrane 23 it also serves to flush impurities from the membrane to extend its life.

All of the water connections to the filter chamber 12, that is, the unpurified water outlet 50, the brine water passageway 47 and the inlet passageway 26, are made in the fixed portion 22 of the filter chamber. This is a major advantage in servicing the purifier, allowing full access to the circumferential surface of the filter membrane 23 for its removal and replacement when the section 21 is unscrewed. This is made possible by positioning the peripheral brine gasket 24 adjacent the same end of the filter assembly as the pure water discharge end of the tube 29, so that the inlet water can be separated from the brine water at that end. In conventional designs, the brine gasket is at the opposite end of the filter membrane; which causes the inlet connection to be at one end of the filter chamber and the outlets at the other. Servicing of the filter in such designs requires the removal of water lines and a complex procedure in gaining access to the filter cartridge so that it can be removed and replaced.

After pure water has been drawn from within the bladder 39 in the tank 11, this region is resupplied with pure water that passes through the reverse-osmosis filter membrane 23 and the pure water passageways 32 and 34 within the body 10. The operation causing this to occur is explained below. As the bladder 39 in the tank 11 fills with pure water, it is necessary to discharge the unpurified water on the outside of the bladder 39 within the tank 11. The latter water is conducted out through the passageway 54, the same passageway it traveled in entering the tank. Between the passageway 54 and the passageway 53 is a valve chamber 56 within which is a spring-loaded ball shut-off valve 57, seen in FIGS. 2 and 6. The valve chamber 56 connects to a passageway 58 within which is a fluted valve actuating member 59 which allows flow past it through the passageway 58. The valve actuating member 59 will be in the position illustrated as the tank is being filled with pure water (as well as after the tank is full), where it engages and unseats the ball valve 57 to permit waste water to flow through the passageway 58. (However, at the time the water is used to squeeze the pure water out of the tank 11, the ball valve 57 is in the closed position, preventing outward flow through the passageway 58.) There is an additional water passageway 60 that connects the passageway 58 to the drain 19. Therefore, as pure water enters the tank 11, the unpurified squeeze water is conducted back out of the tank through the passageway 54 to the valve chamber 56, into the passageway 58 and the passageway 60, to the drain 19. At this time the squeeze valve 51 is closed so that the water does not flow backwards through the passageway 53.

Incorporated within the body 10 are various control water passageways and valve control elements used to effect the automatic operation of the purifier to perform the cycle described above. The control water passageways communicate with the pure water passageway at various locations so that it is the pressure of the pure water within the system that causes the various functions to occur.

Figure 4:
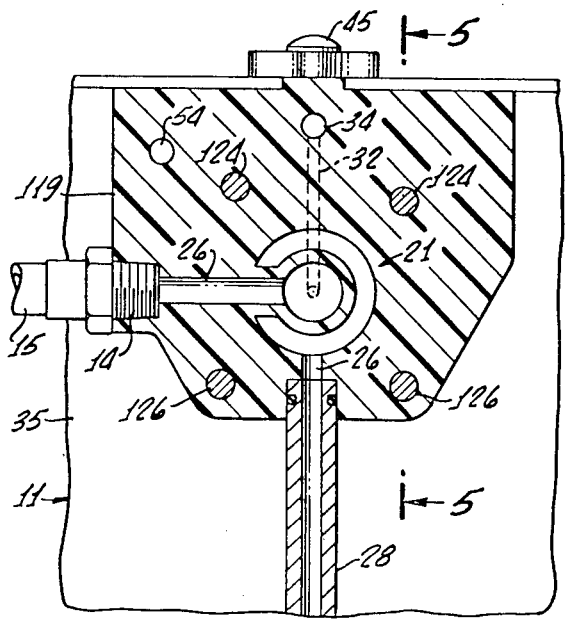
FIG. 4 is a sectional view taken along line 4—4 of FIG. 2.
Figure 7:
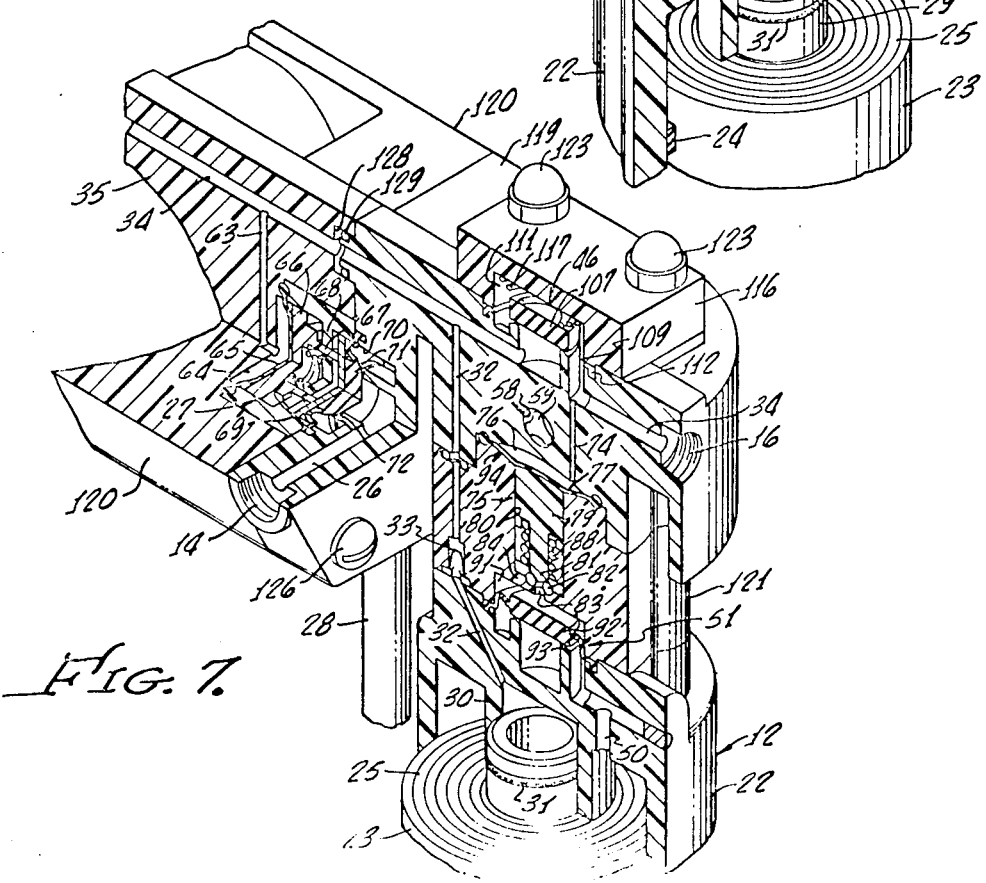
FIG. 7 is a fragmentary perspective view of the purifier partially broken away.
Figure 8:
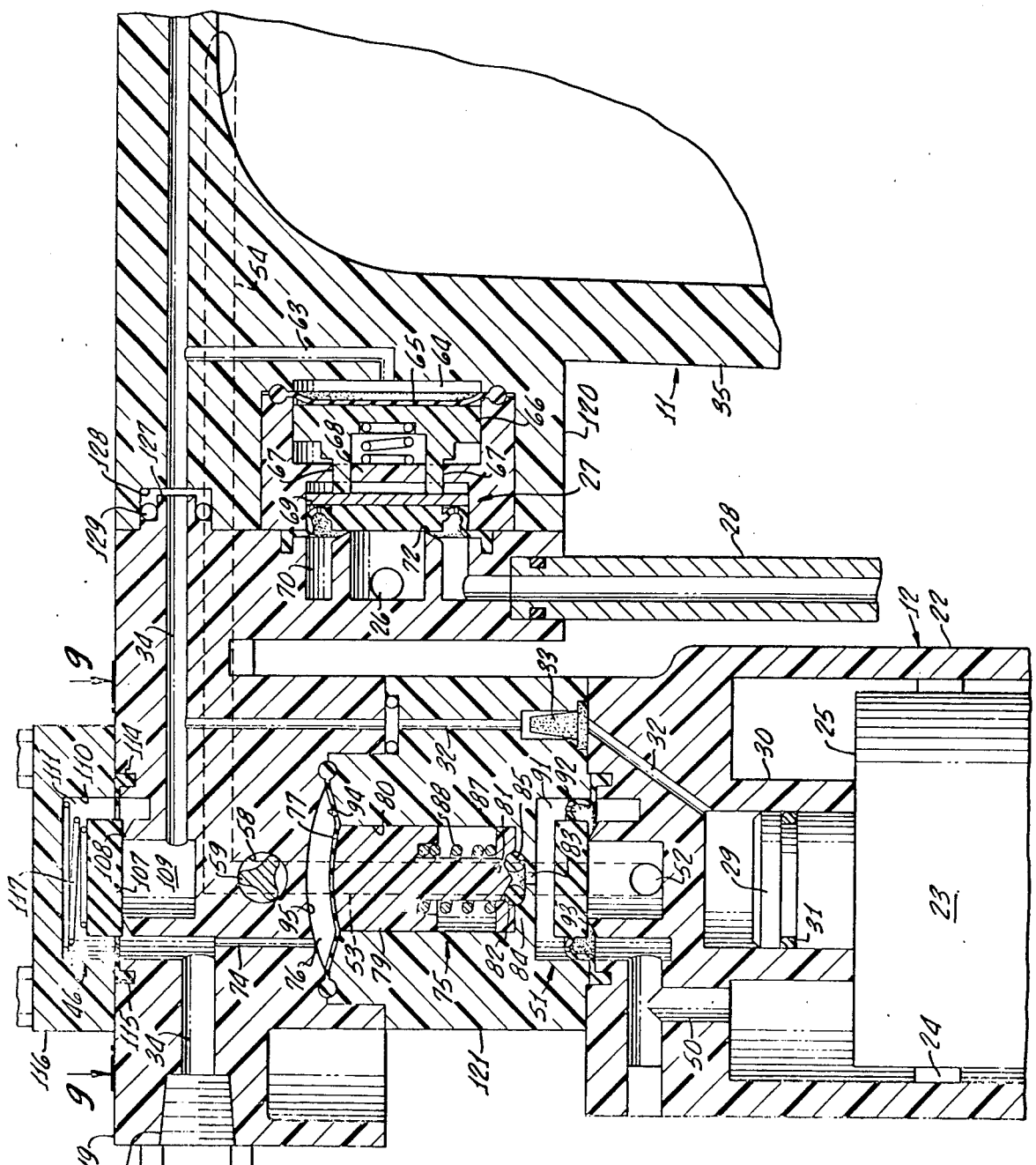
FIG. 8 is an enlarged fragmentary sectional view showing various components of the purifier.
Figure 9:
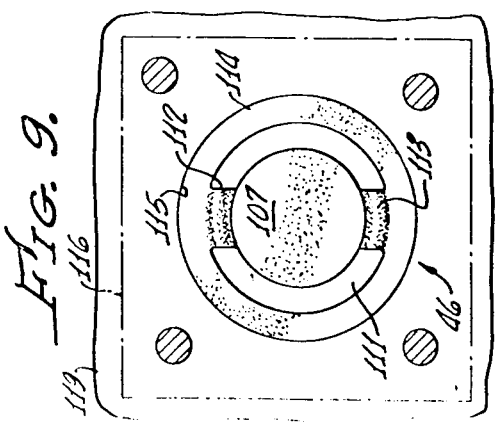
FIG. 9 is a sectional view taken along line 9—9 of FIG. 8.

One control water passageway 63 connects to the pure water passageway 34 between the check valve 46 and the tank 11. The control water passageway 63 connects also to a chamber 64 within which is the actuator for the inlet valve 27, as best seen in FIG. 8. This actuator includes a diaphragm 65 across the outer end of the chamber 64, with one side of the diaphragm 65, therefore, being subjected to the pressure within the control water passageway 63. Beneath the diaphragm 65 is a piston 66 having spaced legs 67 projecting from it on the side opposite from the diaphragm 65. These legs extend through openings in the inner wall 68 of the chamber 64, with their outer ends bearing against a disc 69 in a second chamber 70. On the other side of the disc 69 is a bellows-type diaphragm 71 which is opposite an annular seat 72. The inlet passageway 26 extends from the inlet 14 to the zone within the annular seat 72, as can be seen in FIGS. 4 and 7. Therefore, when the diaphragm 71 is held against the seat 72, the flow is blocked from the inlet 14 past the seat 71 to the filter chamber 12. In that condition, no incoming water can enter the system.

A compression spring 73 beneath the central portion of the piston 65, inside of the legs 67, bears also against the chamber wall 68 to bias the piston away from the disc 69 and the diaphragm 71. When the piston 65 is so moved, the incoming water can open the diaphragm 71 of the inlet valve 27 and flow through the inlet passageway 26 and the tube 28 into the filter chamber 12. However, sufficient pressure within the control passageway 63, reacting against the diaphragm 65, can move the piston 66 and the disc 69 so as to force the diaphragm 71 against the seat 72 to close the inlet.

Another control water passageway 74 communicates with a pilot valve 75 which is located within the body 10, aligned with the filter chamber 12 and the squeeze valve 51 (see FIGS. 2, 7 and 8). The control water passageway 74 connects at one end to the pure water passageway 34 at a location between the check valve 46 and the pure water outlet 16. The other end of the control water passageway 74 connects to a chamber 76 within which is a diaphragm 77. This permits the pressure of the water in the control water passageway 74 to react against the outer surface of the diaphragm 77. Adjacent the inner surface of the diaphragm 77 is a piston 79 slidable within a cylindrical chamber 80 which is substantially perpendicular to the diaphragm. The outer end 81 of the piston 79 is of reduced diameter and provided with a conical tip so as to act as a needle valve. The tapered tip of the end 81 of the needle valve is engageable with an O-ring 82 which is positioned around an opening 83 through the end wall 84 of the chamber 80. The O-ring 82 fits within a recess 85 where it is held by a plastic washer 87. A compression spring 88 bears against the washer 87 to press it against the end wall 84 of the chamber 80. The opposite end of the spring 88 bears against the piston 79, biasing the piston outwardly toward the diaphragm 77. A lateral passageway 89, seen in FIGS. 3 and 6, leads away from the chamber 80, between the washer 87 and the piston 79, and connects to the drain 19.

The opening 83 in the wall 84 connects to the chamber 91 of the squeeze valve 51. Within this chamber is a bellows-type diaphragm 92 engageable with a valve seat 93 to close off the squeeze valve. This can occur in response to pressure within the chamber 91, which can force the diaphragm 92 against the seat 93. However, when the pilot valve 75 is open, the chamber 91 beyond the diaphragm is vented through the opening 83 and the chamber 80 to the drain 19, relieving pressure in the chamber 91. The diaphragm 92 then can be moved from its seat by the pressure of the unpurified water in the passageway 50. This will permit flow through the squeeze valve 51 into the passageway 52 for pressurizing the pure water within the tank 11. When the pilot valve 75 is closed, there is no access to the drain 19 from the chamber 91 beyond the diaphragm 92. Unpurified water from the passageway 59 then can flow through minute openings 95 in the periphery of the diaphragm 92, pressurizing the larger area of the diaphragm on the side remote from the seat 93 for moving the diaphragm 92 to the closed position.

The wall 94 of the chamber 76 is frustoconical, tapering inwardly at a shallow angle from the periphery of the chamber to the cylinder 80 to provide clearance from the movement of the diaphragm 77. The end of the piston 79 adjacent the diaphragm 77 is approximately flush with the end of the cylinder 80 where it meets the surface 94 when the O-ring 82 is engaged and the pilot valve is in the closed position, as illustrated. This means that the diaphragm 77 experiences little flexure as it moves the piston 79, and the diaphragm does not enter the cylinder 80. This is important because if the diaphram 77 were required to enter the cylinder 80 it would bend sharply in doing so and would not move out of the cylinder freely to permit the valve to open. Thus, the pilot valve would not then operate reliably, if at all. Clearance also is provided for outward flexing of the diaphragm 77, when the valve is opened and the end of the piston 79 enters the chamber 76, by a dome-shaped wall 95 opposite from the wall 94.

The check valve 46, pilot valve 75 and squeeze valve 51 are aligned with each other and with the longitudinal axis of the filter chamber 12. The result is a very compact grouping of these valves and the other components of the system.

When the tank 11 is full of purified water and the faucet 18 is closed, the system is shut down with the inlet valve 27 closed, the squeeze valve 51 closed and the pilot valve 75 closed. No flow of water occurs at that time. This is the condition illustrated, except that in FIG. 2 the tank 11 is shown as not quite full so that the bladder 39 may be seen more easily. If the faucet 18 then is opened for drawing pure water, pressure is relieved in the pure water passageway 34. This also relieves the pressure in the control water passageway 63, enabling the compression spring 73 to move the piston 66 away from the disc 69 and the diaphragm 70 so that tap water can enter the inlet 14 and flow through the inlet valve 27 and the passageway 26 toward the filter chamber 12.

Opening the faucet 18 also relieves the pressure in the control water passageway 74 and, hence, in the chamber 76 in back of the diaphragm 77 of the pilot valve 75. This, in turn, relieves the force against the piston 79 so that the compression spring 88 can move the needle valve end 81 away from the O-ring seat 82. This causes the chamber 91 in back of the diaphragm 92 of the squeeze valve 51 to be vented to a lower pressure through the openings 83 and 89 to the drain 19. Consequently, pressurized tap water can flow from the inlet passageway 26 through the filter membrane 23 and into the passageway 50, displacing the diaphragm 92 from its seat 93. This allows the unpurified water to enter the passageway 52, the passageway 53 and the passageway 54. This conducts the unpurified water to the tank 11 on the exterior of the bladder 39 so that this water then can react against the bladder to exert pressure against the pure water within the bladder to force it out through the passageway 34, to the outlet 16 and the line 17.

When the faucet 18 is opened, pressure additionally is relieved in the control water passageway 97 which communicates with the pure water passageway 34 downstream of the check valve 46, i.e., between the check valve and the pure water outlet 16. This relieves the pressure in a chamber 98 in back of a diaphragm 99 (see FIGS. 3 and 6). On the other side of the diaphragm 99 is a piston 100, which is at the outer end of the fluted valve actuator 59. The piston 100 can reciprocate in a cylinder 101 that communicates with the water passageway 58. A compression spring 102 bears against the valve actuator 59 to urge the valve actuator away from the ball valve 57. When such movement occurs, the latter valve then may be moved against its seat 103 by the compression spring 104 that bears against it and by the pressure of the water in the chamber 56. As a result, there is no communication from the chamber 56 to the drain 19, and all of the water coming from the filter chamber 12 through the squeeze valve 51 will be conducted to the tank 11 on the outside of the bladder 39. The closing of the ball valve 57, therefore, prevents dissipation of the pressure of the water used for squeezing the pure water from the tank 11, and precludes loss of squeeze water down the drain outlet 19.

The force of the spring 104 urging the ball 57 toward its seat 103 is adjustable by a screw 105 which engages a disc 106 that is contacted by the outer end of the spring 104.

When the faucet 18 subsequently is closed, the pure water in the line 17 and in the pure water passageway 34 downstream of the check valve 46 is under pressure. This pressure closes the check valve 46 instantaneously so that water is trapped between the faucet 18 and the check valve 46 and its pressure is undiminished. This comes about because of the construction of the check valve, which includes a movable disc 107 of elastomeric material that is enagageable with an annular valve seat 108 to prevent reverse flow of pure water. The pure water passageway 34 from the tank 11 empties into a cylindrical zone 109 beneath the valve seat 108. Outside of the valve seat 108 and spaced from it is a wall 110 defining a chamber 111 that connects to the continuation of the pure water passageway that leads to the faucet 18. Two diametrically opposed narrow strips 112 and 113 extend from the valve disc 107 to a ring 114 beyond the chamber wall 110. An annular recess 115 in the body 10 receives the ring 114, which is integral with the strips 112 and 113, and also with the valve disc 107. A cap 116 fits over the recess 115 and forms a major portion of the chamber 111, thereby attaching the ring 114 to the body 10 of the purifier. In back of the disc 107, on the side opposite from the seat 108, is a light conical spring 117 which biases the disc toward the seat.

The strips 112 and 113 are of an undulent shape in side elevation, as shown in FIG. 6, so that they are capable of being extended. This enables these strips to allow limited movement of the valve disc 107 away from the seat 108, while guiding its return movement.

When the faucet 18 is opened, the pressure is relieved on the downstream end of the check valve 46, so that pure water in the passageway 34 forces the valve disc 107 off the seat 108 against the resistance of the spring 117, allowing pure water to be discharged. When the faucet 18 subsequently is closed, the pressurized water downstream of the valve 46 immediately forces the disc 107 back against the seat 108 to trap full pressure between the check valve and the faucet, despite the small volume of water involved. This assures the existence of adequate pressure to operate the pilot valve 75 and the shut-off valve 57. It also renders the valve operation noiseless because there is virtually no reverse flow as the check valve 46 closes. A check valve having only one strip, or hinge, connecting the valve member to the structure, or of any other known design, will not achieve the rapid action and preservation of water pressure as accomplished by the valve 46.

The pressure of the pure water trapped downstream of the check valve 46 is transmitted through the control water passageway 74 to the chamber 76 in back of the diaphragm 77 of the pilot valve 75. This causes the diaphragm 77 to push against the piston 79, moving the needle valve end 81 against the O-ring seat 82 to close the opening 83. This means that there is no longer communication between the chamber 91 of the squeeze valve 51 and the drain 19. Consequently, water will pass through the small openings 95 in the diaphragm 92 outside of the seat 93 and move the diaphragm against its seat. This closes the squeeze valve 51 so that pressurized water no longer can be conducted to the exterior of the bladder 39 within the tank 11.

With the faucet 18 closed, the pressure of the water downstream of the check valve 46 also is communicated through the control water passageway 97 to the chamber 98 in back of the diaphragm 99. This causes the latter diaphragm to move the piston 100 toward the ball valve 57, as a result of which the valve actuator 59 unseats the ball valve 57 and opens communication from the pasageways 54, 58 and 60 to the drain 19.

After the faucet 18 has been closed, the inlet valve 27 initially remains open, allowing water to flow through the inlet passageway 26 past the inlet valve, through the tube 28, and into the filter chamber 12 on the outside of the filter membrane 23. A portion of this water flows through the filter membrane to its center and is discharged into the pure water passageway 32. The remaining brine water flows outwardly through the brine water passageway 47 past the check valve 57 to the drain 19. The pure water flowing into the passageway 32 is conducted past the check valve 33 through the pure water passageway 34 into the interior of the tank 11 inside the bladder 39.

As the pure water flows into the tank inside the bladder 39, it displaces unpurified water from outside of the bladder into the passageway 54. This water flows to the check valve chamber 56 and past the ball valve 57, into the passageway 58, to the passageway 60 and the drain 19. Ultimately, the pure water will fill the tank 11, displacing all of the unpurified water from outside of the bladder 39. When this occurs, pressure builds up in the pure water passageway 34 upstream of the check valve 46. This pressure is communicated through the control water passageway 63 to the chamber 64 of the inlet valve 27. There it reacts against the diaphragm 65 to force the piston 66 inwardly, moving with it the disc 69 and the diaphragm 71. This forces the diaphragm 71 against its seat 72, which cuts off the flow of inlet water. Therefore, the system again achieves a state of static equilibrium, with no water flowing. A full reservoir of pure water is available for consumption at the faucet 18.

Figure 5:
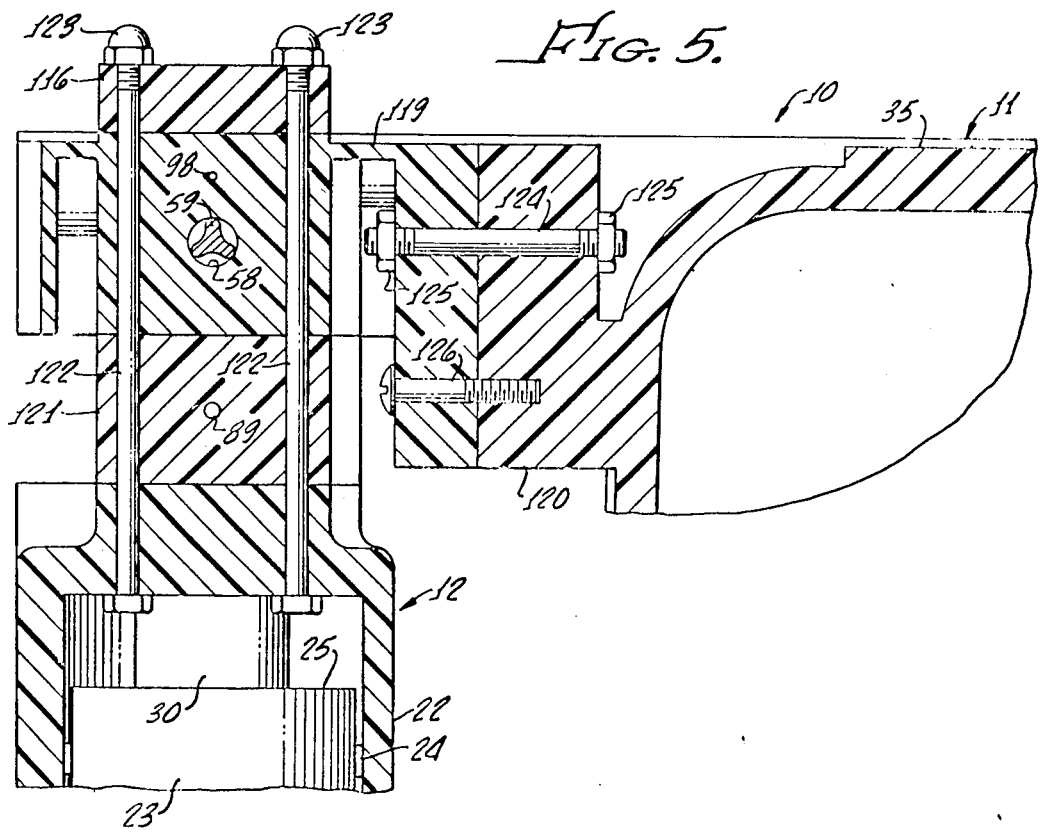
FIG. 5 is a sectional view taken along line 5—5 of FIG. 3 and line 5—5 of FIG. 4, illustrating the manner in which the body components are secured together.

The purifier is made up of a minimum number of parts and is readily assembled into the completed unit. The principal components of the unitary body 10, in addition to the tank 11 and filter chamber 12, include a housing 119 adjacent the lateral extension 120 of the cap 35 of the tank 11, and a housing 121 between the housing 119 and the fixed end portion 22 of the filter chamber 12. Four bolts 122 extend from the interior of the filter chamber 12 at its fixed end portion 22 through the housing 121 and the housing 119, as well as the cap 116 of the check valve 46. Nuts 123 are threaded onto the outer ends of the bolts 122. This holds the elements 22, 121 and 119 together, as seen in FIG. 5. The housing 119 is secured to the lateral extension 120 of the end cap 35 of the tank 11 by studs 124 which are threaded at their opposite ends and receive nuts 125, as well as by screws 126 that extend into threaded openings in the lateral extension 120. No other connections are required.

Sealing of the various passageways at the points of connection between adjacent components of the body 10 is accomplished by a cylindrical boss on one component entering a recess in the other and surrounded by an O-ring. Exemplary is the boss 127 shown in FIG. 8 where the passageway 34 extends from the housing 119 to the lateral extension 120 of the tank end cap 35. The boss 127 fits within a larger cylindrical recess 128, and a seal is accomplished by an O-ring 129 that circumscribes the boss. Similar provisions are made at the other locations where the passageways connect in the different housing components.

The foregoing detailed description is to be clearly understood as given by way of illustration and example only, the spirit and scope of this invention being limited solely by the appended claims.

What is claimed is:

1. A water purifier comprising
   a filter chamber,
   a reverse-osmosis filter membrane in said filter chamber,
      said reverse-osmosis filter membrane having a cylindrical exterior surface, a tank,
   movable means in said tank dividing said tank into two chambers of variable volume,
      the first of said chambers being adapted to receive pure water,
      the second of said chambers being adapted to receive unpurified water,
   a water inlet adapted for connection to a source of tap water under pressure,
   a first water passageway for conducting tap water from said inlet to said filter chamber so that a portion thereof can be purified by passing through said reverse-osmosis filter membrane, and another portion can remain unpurified,
   a first water outlet adapted for connection to a pure water line having a valve therein for tansmission to a location of consumption,
   a second water passageway for conducting pure water from said filter chamber to said first chamber of said tank, and from said first chamber of said tank to said first water outlet, a second water outlet, a third water passageway for conducting unpurified water from said filter chamber to said second outlet, and to said second chamber of said tank for forcing purified water out of said first chamber of said tank to said first water outlet, control valve means for controlling the flow of tap water in said first water passageway, the flow of pure water in said second water passageway, and the flow of unpurified water in said third water passageway, control passageway means connected to said second water passageway for transmitting the pressure in said second water passageway to said control valve means for effecting automatic operation thereof entirely in response to the pressure of said pure water, said filter chamber including a first part fixed relative to said tank and defining one end portion of said filter chamber, and a second part rotatably coupled to said first part for permitting separation of said second part from said first part for removal and replacement of said reverse-osmosis filter membrane, one end of said reverse-osmosis filter membrane being received in said first part and the opposite end of said reverse-osmosis filter membrane being received in said second part, such that a portion of the circumference of said reverse-osmosis filter is exposed upon such separation of said second part from said first part, for facilitating removal and replacement of said reverse-osmosis filter membrane, said reverse-osmosis filter membrane having an axially projecting outlet at said one end thereof for discharging pure water therefrom, said first part of said filter chamber including a tubular section receiving said projecting outlet of said reverse-osmosis filter membrane, whereby pure water is discharged into said tubular section, said second water passageway being connected to said tubular section for receiving pure water therefrom, said third water passageway being connected to said first part of said filter chamber outside of said tubular section for receiving unpurified water, said first water passageway being connected to said first part of said filter chamber at a location relative to said one end of said filter membrane which is axially inward of said connection of said third water passageway to said first part, and an annular seal around said reverse-osmosis filter membrane and engaging the wall of said first part of said filter chamber, said annular seal being between said connection of said third water passageway and said connection of said first water passageway to said first part of said filter chamber for separating the same.

2. A device as recited in claim 1 in which said third water passageway includes two portions each of which connects to said first part of said filter chamber, one of said portions of said third water passageway being connected to said second outlet and the other of said portions of said third water passageway being connected to said second chamber of said tank.

3. A device as recited in claim 1 in which said wall of said first part of said filter chamber is substantially cylindrical, and said inlet passageway is connected to said substantially cylindrical wall of said first part of said filter chamber.

4. A device as recited in claim 1 in which said second part of said filter chamber is longer than said first part of said filter chamber, a greater part of said reverse-osmosis filter membrane being in said second part of said filter chamber than in said first part of said filter chamber for facilitating access to said reverse-osmosis filter membrane.

5. A device as recited in claim 1 in which said water purifier includes a unitary body, said tank and said filter chamber being part of said body, said first, second and third water passageways, and said control valve means being within said body.

6. A device as recited in claim 5 in which said body has no locations for external connections for transmitting water other than at said inlet and said first and second outlets.

7. A compact water purifier comprising a unitary body including a tank, and a filter chamber, movable means in said tank dividing said tank into two chambers of variable volume, the first of said chambers being for receiving pure water, the second of said chambers being for receiving unpurified water, a reverse-osmosis filter membrane in said filter chamber, said body including an inlet for connection to a source of pressurized tap water, a first water outlet for discharging unpurified water to a drain, and a second outlet for discharging pure water, said body having no other water inlets and water outlets, a line connected to said second outlet, an outlet valve in said line for controlling the flow of pure water through said line, said body including therein an inlet passageway connecting said inlet to said filter chamber for conducting tap water to said filter chamber so that a portion thereof can be purified by passing through said reverse-osmosis filter membrane and another portion thereof can remain unpurified, a pure water passageway connecting said filter chamber to said first chamber of said tank for conducting pure water from said filter chamber to said first chamber of said tank for filling said first chamber of said tank, and connecting said first chamber of said tank to said second outlet for conducting pure water from said first chamber of said tank to said second outlet for transmission through said line as controlled by said outlet valve, and an unpurified water passageway connecting said filter chamber to said first outlet for conducting unpurified water from said filter chamber to said first outlet and connecting said second chamber of said tank to said first outlet for conducting unpurified water from said second chamber of said tank to said first outlet when said first chamber is being filled with pure water, and connecting said filter chamber to said second chamber of said tank for conducting unpurified water from said filter chamber to said second chamber of said tank for reacting against said movable means and forcing purified water out of said first chamber of said tank to said second outlet and said line when pure water is to be drawn from said line, a metering means in said unpurified water passageway for controlling the ratio of unpurified water conducted from said filter chamber to said first outlet to pure water conducted from said filter chamber to said first chamber of said tank as said first chamber of said tank is being filled with pure water, and pressure-responsive control valve means within said body for controlling the flow of tap water in said inlet passageway, the flow of pure water in said pure water passageway and the flow of unpurified water in said unpurified water passageway, said body including therein control passageways connected to said pure water passageway and to said control valve means for transmitting pure water pressure to said control valve means for effecting operation thereof in response to the pressure of said pure water, said control valve means being operable entirely hydraulically in response to pure water pressure occurring from the opening and closing of said outlet valve for so causing said tap water, said unpurified water, and said pure water to flow, for preventing flow of unpurified water from said filter chamber to said first outlet other than through said metering means when said unpurified water is so reacting against said movable means, and for shutting off the flow through said inlet and said first outlet when said first chamber of said tank is full of pure water.

8. A device as recited in claim 7 in which said body includes an interconnecting portion extending between said filter chamber and said tank.

9. A device as recited in claim 8 in which said inlet is located in said interconnecting portion of said body.

10. A device as recited in claim 8 in which said body is in a plurality of parts secured together.

11. A device as recited in claim 10 in which said inlet passageway includes spaced portions in said body, and including a substantially rigid straight tubular member interconnecting said spaced portions thereof.

12. A device as recited in claim 8 in which said filter chamber and said tank are elongated and positioned in a side-by-side relationship, said interconnecting portion extending between one end of said filter chamber and one end of said tank.

13. A device as recited in claim 12 in which said pure water passageway includes a principal portion extending across one end of said body, between said one end of said tank and a location spaced outwardly of said one end of said filter chamber, said control valve means including
an inlet valve in said inlet passageway,
a squeeze valve in said unpurified water passageway for controlling the flow of unpurified water to said second chamber of said tank,
a pilot valve for controlling the operation of said squeeze valve,
and a shutoff valve for shutting off said unpurified water passageway from said outlet other than through said metering means, said inlet valve, said squeeze valve, said pilot valve, said metering means and said shutoff valve being positioned inwardly of said principal portion of said pure water passageway with respect to said one end of said body.

14. A device as recited in claim 13 in which said unpurified water passageway includes a portion adjacent said one end of said tank and substantially parallel to said principal portion of said pure water passageway.

15. A device as recited in claim 13 in which said principal portion of said pure water passageway is substantially straight and perpendicular to the longitudinal axes of said tank and of said filter chamber.

16. A device as recited in claim 13 in which said control valve means includes a check valve in said principal portion of said pure water passageway between said tank and said second outlet.

17. A device as recited in claim 13, in which said control valve means includes a check valve, and in which said check valve, said pilot valve and said squeeze valve are aligned with each other and with the longitudinal axis of said filter chamber, for thereby minimizing the overall dimension of said control valve means.

18. A device as recited in claim 13 in which said inlet valve is located in said interconnecting portion of said body.

19. A device as recited in claim 8 in which at least a part of said filter chamber is substantially cylindrical and said reverse-osmosis filter membrane is substantially cylindrical and of smaller diameter than the inside diameter of said filter chamber, said pure water passageway and said unpurified water passageway connecting to said filter chamber at one end thereof, said inlet passageway connecting to said filter chamber adjacent said one end of said filter chamber, and including a seal between said filter membrane and the inside wall of said filter chamber, said seal being located between said one end of said filter chamber and said connection of said inlet passageway to said filter chamber.

20. A device as recited in claim 19 in which at said one end and inwardly thereof to the location of said connection of said inlet passageway said filter chamber has a reduced inside diameter, said filter membrane extending into said portion of reduced diameter, said seal being an annular gasket engaging said filter membrane and said interior wall of said filter chamber in said portion of reduced diameter.

21. A device as recited in claim 19 in which said filter chamber includes a relatively short portion at said one end thereof fixed relative to said tank and said interconnecting portion, and a relatively longer portion extending outwardly therefrom, said portions being threaded together to permit said longer portion to be removed for replacement of said filter membrane.

22. A water purifier comprising
a tank,
a filter chamber,
a reverse-osmosis filter membrane in said filter chamber,
movable means in said tank dividing said tank into two chambers of variable volume,
the first of said chambers being adapted to receive pure water,
the second of said chambers being adapted to receive unpurified water, a water inlet for connection to a source of tap water,
a first water outlet for connection to a drain,
a second water outlet,
outlet valve means connected to said second water outlet for controlling the flow therethrough and transmitting water therefrom,
an inlet passageway communicating with said inlet for conducting tap water to said filter chamber so that a portion thereof can be purified by passing through said reverse-osmosis filter membrane and another portion thereof can remain unpurified,
a pure water passageway for conducting pure water from said filter chamber to said first chamber of said tank and from said first chamber of said tank to said second water outlet,
an unpurified water passageway for conducting unpurified water from said filter chamber to said first water outlet, and to said second chamber of said tank for forcing purified water out of said first chamber of said tank to said second water outlet and to said outlet valve means,
control valve means for controlling the flow of tap water in said inlet passageway, the flow of pure water in said pure water passageway and the flow of unpurified water in said unpurified water passageway for so conducting unpurified water from said filter chamber to said second chamber of said tank when said outlet valve means is open, and for entirely shutting off the flow in said inlet passageway, in said pure water passageway and in said unpurified water passageway when said first chamber of said tank is full and said outlet valve means is closed,
control passageway means connected to said pure water passageway for transmitting the pressure of said pure water to said control valve means for effecting operation thereof entirely in response to the pressure of said pure water in said pure water passageway,
said control valve means including
a squeeze valve, and a pilot valve,
said squeeze valve being positioned in said unpurified water passageway for controlling the flow of said unpurified water to said second chamber of said tank,
and including a chamber, a pressure responsive element in said chamber and a seat,
said pressure responsive element being movable away from said seat in response to a reduction in pressure in said chamber for allowing said squeeze valve to open,
said pilot valve including
a first chamber communicating with said chamber of said squeeze valve and with a location of relatively low pressure,
piston movable in said first chamber of said pilot valve between one position for preventing flow from said chamber of said squeeze valve to said location of relatively low pressure, and another position for venting said chamber of said squeeze valve to said location of relatively low pressure for permitting said squeeze valve to open,
a second chamber,
and a diaphragm in said second chamber,
said first chamber connecting to said second chamber on one side of said diaphragm,
said control passageway means communicating with said second chamber on the opposite side of said diaphragm for permitting the pressure exerted in said control passageway means to deflect said diaphragm against said piston and move said piston to said one position thereof,
said second chamber having a wall connecting to said cylinder and tapering to said cylinder from the periphery of said wall at a shallow angle relative to said diaphragm for providing a clearance for said diaphragm and preventing said diaphragm from entering said cylinder when said diaphragm is so deflected in response to pressure in said control passageway means.

23. A water purifier comprising
a tank,
a filter chamber,
a reverse-osmosis filter membrane in said filter chamber, movable means in said tank dividing said tank into two chambers of variable volume,
the first of said chambers being adapted to receive pure water,
the second of said chambers being adapted to receive unpurified water,
a water inlet for connection to a source of tap water,
a first water outlet for connection to a drain,
a second water outlet,
outlet valve means connected to said second water outlet for controlling the flow therethrough and transmitting water therefrom,
an inlet passageway communicating with said inlet for conducting tap water to said filter chamber so that a portion thereof can be purified by passing through said reverse-osmosis filter membrane and another portion thereof can remain unpurified,
a pure water passageway conducting pure water from said filter chamber to said first chamber of said tank and from said filter chamber of said tank to said second water outlet,
an unpurified water passageway for conducting unpurified water from said filter chamber to said first water outlet, and to said second chamber of said tank for forcing purified water out of said first chamber of said tank to said second water outlet and to said outlet valve means, control valve means for controlling the flow of tap water in said inlet passageway, the flow of pure water in said pure water passageway and the flow of unpurified water in said unpurified water passageway for so conducting unpurified water from said filter chamber to said second chamber of said tank when said outlet valve means is open, and for entirely shutting off the flow in said inlet passageway, in said pure water passageway and in said unpurified water passageway when said first chamber of said tank is full and said outlet valve means is closed,
control passageway means connected to said pure water passageway for transmitting the pressure of said pure water to said control valve means for effecting operation thereof entirely in response to the pressure of said pure water in said pure water passageway,
said control valve means including
a squeeze valve, and a pilot valve,
said squeeze valve being positioned in said unpurified water passageway for controlling the flow of said unpurified water to said second chamber of said tank, and including a chamber, a pressure responsive element in said chamber and a seat, said pressure responsive element being movable against said seat in response to pressure in said chamber for closing said squeeze valve, said pilot valve including a chamber communicating with said chamber of said squeeze valve and with a location of relatively low pressure, a movable element engageable with said seat of said pilot valve in one position for preventing flow from said chamber of said squeeze valve to said location of relatively low pressure, and remote from said seat of said pilot valve in another position for venting said chamber of said squeeze valve to said location of relatively low pressure for permitting said squeeze valve to open, said movable element comprising a member having a tapered portion, said seat comprising an O-ring engaged by said tapered portion when said movable element is in said one position.

24. A device as recited in claim 23 in which said movable element includes a piston, said chamber of said pilot valve defining a cylinder receiving said piston, said member with said tapered portion extending from said piston and being of smaller lateral dimension than said piston, said chamber defining a recess for said O-ring, a washer adjacent said recess for holding said O-ring in said recess, and a compression spring interposed between said washer and said piston for biasing said washer toward said recess and biasing said piston away from said O-ring.

25. A device as recited in claim 24 in which said pilot valve includes means defining a second chamber, and a diaphragm in said second chamber, said cylinder connecting to said second chamber on one side of said diaphragm, said control passageway means communicating with said second chamber on the opposite side of said diaphragm for permitting the pressure exerted in said control passageway means to move said diaphragm against said tapered portion and cause said piston to be moved against said O-ring in opposition to said compression spring.

26. A device as recited in claim 25 in which said diaphragm is substantially perpendicular to said cylinder, one end of said piston extending substantially at least to the intersection of said cylinder and said second chamber when said movable element is in said one position, and said one end of said piston extending into said second chamber when said movable element is in said other position remote from said seat, said second chamber having a wall connecting to said cylinder and tapering to said cylinder from the periphery of said wall at a shallow angle relative to said diaphragm for providing a clearance for said diaphragm and preventing said diaphragm from being deflected into said cylinder when said diaphragm is so moved in response to pressure in said control passageway means.

27. A water purifier comprising a tank, a filter chamber, a reverse-osmosis filter membrane in said filter chamber, movable means in said tank dividing said tank into two chambers of variable volume, the first of said chambers being adapted to receive pure water, the second of said chambers being adapted to receive unpurified water, a water inlet for connection to a source of tap water, a first water outlet for connection to a drain, a second water outlet, outlet valve means connected to said second water outlet for controlling the flow therethrough and transmitting water therefrom, an inlet passageway communicating with said inlet for conducting tap water to said filter chamber so that a portion thereof can be purified by passing through said reverse-osmosis filter membrane and another portion thereof can remain unpurified, a pure water passageway conducting pure water from said filter chamber to said first chamber of said tank and from said filter chamber of said tank to said second water outlet, an unpurified water passageway for conducting unpurified water from said filter chamber to said first water outlet, and to said second chamber of said tank for forcing purified water out of said first chamber of said tank to said second water outlet and to said outlet valve means, control valve means for controlling the flow of tap water in said inlet passageway, the flow of pure water in said pure water passageway and the flow of unpurified water in said unpurified water passageway for so conducting unpurified water from said filter chamber to said second chamber of said tank when said outlet valve means is open, and for entirely shutting off the flow in said inlet passageway, in said pure water passageway and in said unpurified water passageway when said first chamber of said tank is full and said outlet valve means is closed, control passageway means connected to said pure water passageway for transmitting the pressure of said pure water to said control valve means for effecting operation thereof entirely in response to the pressure of said pure water in said pure water passageway, said control valve means including a shutoff valve in said unpurified water passageway between said second chamber of said tank and said first water outlet, said shutoff valve, when open, allowing flow from said second chamber of said tank to said first water outlet for disposing of unpurified water when said first chamber of said tank fills with pure water, said shutoff valve, when closed, preventing flow of unpurified water to said first water outlet so that said unpurified water can be conducted to said second chamber of said tank for forcing pure water from said first chamber of said tank to said second water outlet, said shutoff valve including means defnining a chamber, a seat in said chamber, a ball valve member in said chamber and movable to engage said seat to shut said shutoff valve, and movable away from said seat to open said shutoff valve, resilient means engaging said ball valve member on one side thereof for biasing said ball valve member toward said seat, a valve actuator engageable with said ball valve member on the opposite side thereof and movable in one direction for displacing said ball valve member away from said seat, said valve actuator including a piston and a portion projecting therefrom for so engaging said ball valve member, means defining a cylinder receiving said piston, a diaphragm one side of which is engageable with said piston, said control passageway means including a portion thereof communicating with the opposite side of said diaphragm, whereby pressure in said portion of said control passageway means can react against said diaphragm for forcing said piston in said one direction for causing said valve actuator to so displace said ball valve member from said seat, and including resilient means biasing said valve actuator in the opposite direction for allowing said ball valve member to engage said seat.

28. A water purifier comprising
a tank,
a filter chamber,
a reverse-osmosis filter membrane in said filter chamber,
movable means in said tank dividing said tank into two chambers of variable volume,
the first of said chambers being adapted to receive pure water,
the second of said chambers being adapted to receive unpurified water,
a water inlet for connection to a source of tap water,
a first water outlet for connection to a drain,
a second water outlet for connection to a point of consumption of pure water,
outlet valve means connected to said second water outlet for controlling the flow therethrough and transmitting water therefrom,
an inlet passageway communicating with said inlet for conducting tap water to said filter chamber so that a portion thereof can be purified by passing through said reverse-osmosis filter membrane and another portion thereof can remain unpurified,
a pure water passageway for conducting pure water from said filter chamber to said first chamber of said tank and from said first chamber of said tank to said second water outlet,
an unpurified water passageway for conducting unpurified water from said filter chamber to said first water outlet, and to said second chamber of said tank for forcing purified water out of said first chamber of said tank to said second water outlet and to said outlet valve means,
control valve means for controlling the flow of tap water in said inlet passageway, the flow of pure water in said pure water passageway and the flow of unpurified water in said unpurified water passageway for so conducting unpurified water from said filter chamber to said second chamber of said tank when said outlet valve means is open, and for entirely shutting off the flow in said pure water passageway and said unpurified water passageway when said first chamber of said tank is full and said outlet valve means is closed,
control passageway means connected to said pure water passageway for transmitting the pressure of said pure water to said control valve means for effecting operation thereof entirely in response to the pressure of said pure water in said pure water passageway,
said control valve means including a check valve in said pure water passageway between said first chamber of said tank and said second water outlet for conducting pure water only toward said second water outlet,
said control passageway means including passageway means connected to said pure water passageway downstream of said check valve for effecting operation of a portion of said control valve means in response to the pressure of pure water in said pure water passageway downstream of said check valve,
said check valve including
a surface defining an annular valve seat
for transmitting pure water outwardly past said valve seat,
wall means defining a chamber around said valve seat,
a movable member engageable with said valve seat for preventing the flow of pure water past said valve seat and movable to a position remote from said valve seat for permitting the flow of pure water past said valve seat,
means connecting said member to said wall means for restricting the movement of said movable member, said connecting means comprising a plurality of spaced elements extending between said wall means and said member so as to provide a pathway therebetween for the flow of pure water when said member is remote from said valve seat, each of said spaced elements being flexible and of a length sufficient to allow said member to move a limited distance away from said valve seat in response to the pressure of pure water upstream thereof,
and resilient means biasing said member toward said valve seat.

29. A device as recited in claim 28 in which each of said elements is substantially undulant in contour.

30. A device as recited in claim 29 in which said elements are integral with said member.

31. A device as recited in claim 30 in which said elements and said member are of elastomeric material.

32. A device as recited in claim 30 in which there are two of said elements positioned diametrically opposite from each other.

33. A device as recited in claim 30 in which said elements are relatively narrow strips.

34. A device as recited in claim 30 including an annular means integral with said elements and spaced outwardly from said movable member, said wall means engaging and retaining said annular means, whereby said elements are attached to said wall means.

35. A water purifier comprising
a filter chamber, a reverse-osmosis filter membrane in said filter chamber,
a tank,
movable means in said tank dividing said tank into two chambers of variable volume,
the first of said chambers being adapted to receive pure water,
the second of said chambers being adapted to receive unpurified water,
a water inlet adapted for connection to a source of tap water under pressure,
a first water passageway for conducting tap water from said inlet to said filter chamber so that a portion thereof can be purified by passing through said reverse-osmosis filter membrane, and another portion can remain unpurified,
a first water outlet adapted for connection to a pure water line having a valve therein for transmission to a location of consumption,
a second water passageway for conducting pure water from said filter chamber to said first chamber of said tank, and from said first chamber of said tank to said first water outlet,
a second water outlet,
a third water passageway for conducting unpurified water from said filter chamber to said second water outlet, and to said second chamber of said tank for forcing purified water out of said first chamber of said tank to said first water outlet,
control valve means for controlling the flow of tap water in said first water passageway, the flow of pure water in said second water passageway, and the flow of unpurified water in said third water passageway,
means for transmitting the pressure in said second water passageway to said control valve means for effecting automatic operation thereof entirely in response to the pressure of said pure water,
said filter chamber including a first part defining one end portion of said filter chamber, and a second part coupled to said first part for permitting relative separation of said first and second parts for removal and replacement of said reverse-osmosis filter membrane, one end of said reverse-osmosis filter membrane being received in said first part and the opposite end of said reverse-osmosis filter membrane being received in said second part, such that a portion of said reverse-osmosis filter membrane is exposed upon such separation of said second part from said first part, for facilitating removal and replacement of said reverse-osmosis filter membrane, said reverse-osmosis filter membrane having an outlet at said one end thereof for discharging pure water therefrom,
said filter chamber including outlet means connected to said outlet of said reverse-osmosis filter membrane,
said second water passageway being connected to said outlet means of said filter chamber for receiving pure water therefrom,
said third water passageway being connected to said filter chamber for receiving unpurified water therefrom,
said first water passageway being connected to said filter chamber at a location which is spaced from said connection of said third water passageway to said filter chamber, and an annular seal around said reverse-osmosis filter membrane and engaging the wall of said first part of said filter chamber,
said annular seal being between said connection of said third water passageway and said connection of said first water passageway to said filter chamber for separating the same.

36. A compact water purifier comprising
a unitary body including a tank, and a filter chamber,
movable means in said tank dividing said tank into two chambers of variable volume,
the first of said chambers being for receiving pure water,
the second of said chambers being for receiving unpurified water,
a reverse-osmosis filter membrane in said filter chamber,
said body including
an inlet for connection to a source of pressurized tap water,
a first water outlet for discharging unpurified water to a drain,
and a second outlet for discharging pure water,
a line connected to said second outlet,
an outlet valve in said line for controlling the flow of pure water through said line,
said body including therein
an inlet passagway connecting said inlet to said filter chamber for conducting tap water to said filter chamber so that a portion thereof can be purified by passing through said reverse-osmosis filter membrane and another portion thereof can remain unpurified,
a pure water passageway connecting said filter chamber to said first chamber of said tank for conducting pure water from said filter chamber to said first chamber of said tank for filling said first chamber of said tank, and connecting said first chamber of said tank to said second outlet for conducting pure water from said first chamber of said tank to said second outlet for transmission through said line as controlled by said outlet valve, and
an unpurified water passageway connecting said filter chamber to said first outlet for conducting unpurified water from said filter chamber to said first outlet and connecting said second chamber of said tank to said first outlet for conducting unpurified water from said second chamber of said tank to said first outlet when said first chamber is being filled with pure water, and connecting said filter chamber to said second chamber of said tank for conducting unpurified water from said filter chamber to said second chamber of said tank for reacting against said movable means and forcing purified water out of said first chamber of said tank to said second outlet and said line when pure water is to be drawn from said line,
a metering means in said unpurified water passageway for controlling the ratio of umpurified water conducted from said filter chamber to said first outlet to pure water conducted from said filter chamber to said first chamber of said tank as said first chamber of said tank is being filled with pure water, and
pressure-responsive control valve means within said body for controlling the flow of tap water in said inlet passageway, the flow of pure water in said pure water passageway and the flow of unpurified water in said unpurified water passageway, said body including therein means for providing communication between said pure water passageway and said control valve means for transmitting pure water pressure to said control valve means, said control valve means being operable entirely hydraulically in response to pure water pressure for so causing said tap water, said unpurified water, and said pure water to flow, for preventing flow of unpurified water from said filter chamber to said first outlet other than through said metering means when said unpurified water is so reacting against said movable means, and for shutting off the flow through said inlet and said first outlet when said first chamber of said tank is full of pure water.

* * * * *